Dec. 12, 1967  R. J. STEARN ET AL  3,357,246
MULTI-STAGE ULTRASONIC PROBE
Filed Aug. 2, 1965  4 Sheets-Sheet 3
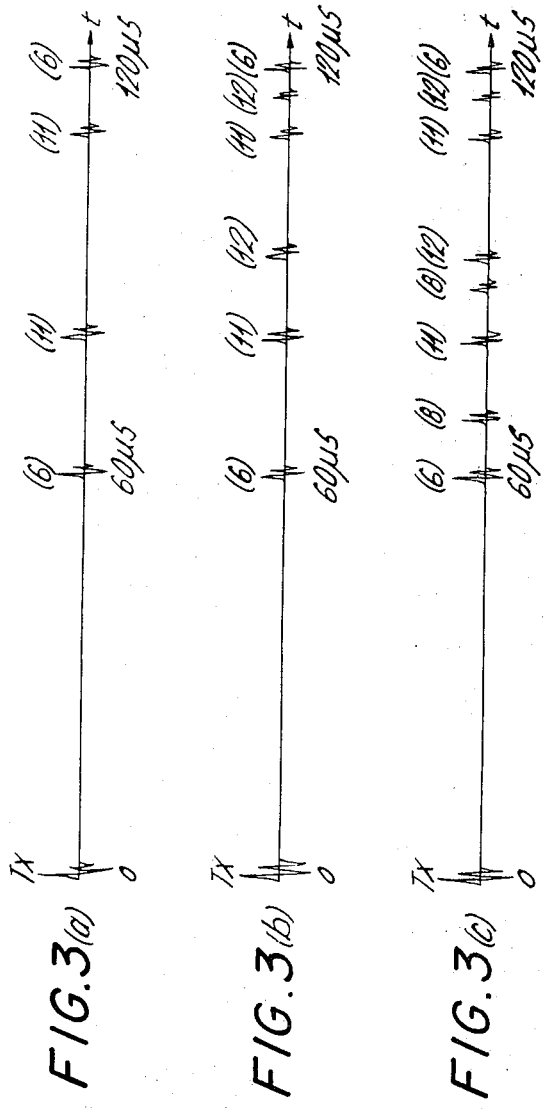
INVENTORS
RICHARD JOHN STEARN
ANTHONY CHARLES RICHARDSON
BY
MORGAN, FINNEGAN, DURHAM & PINE
ATTORNEYS

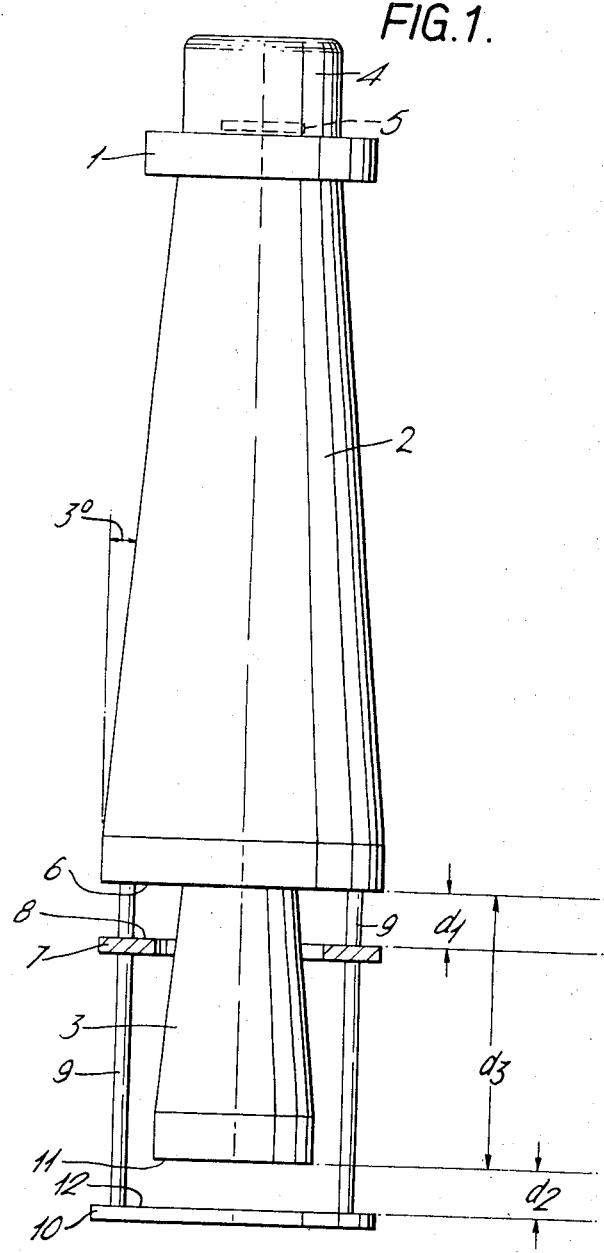

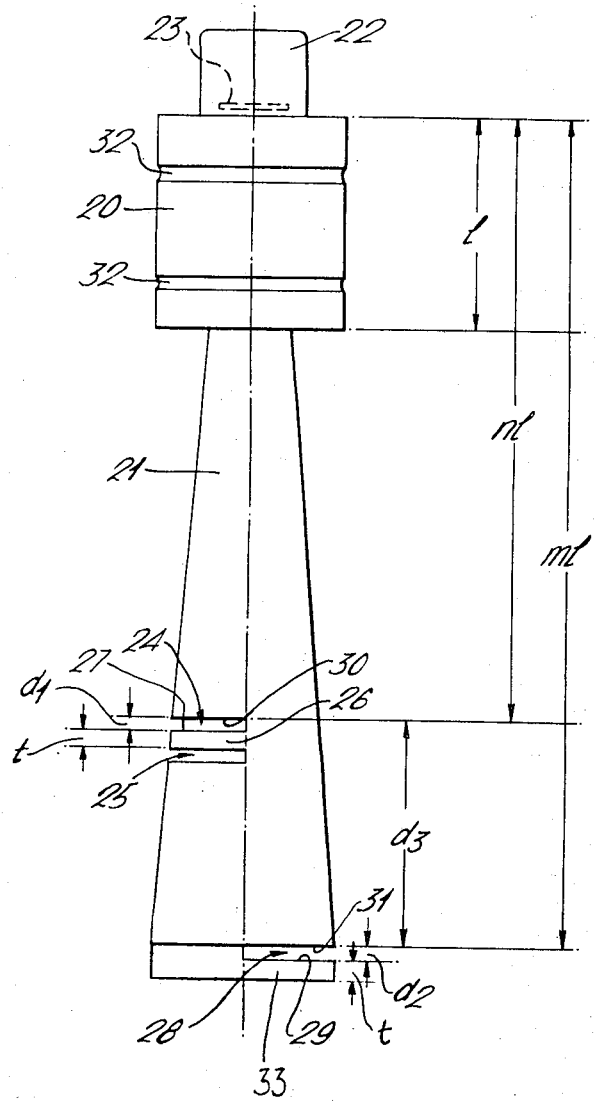

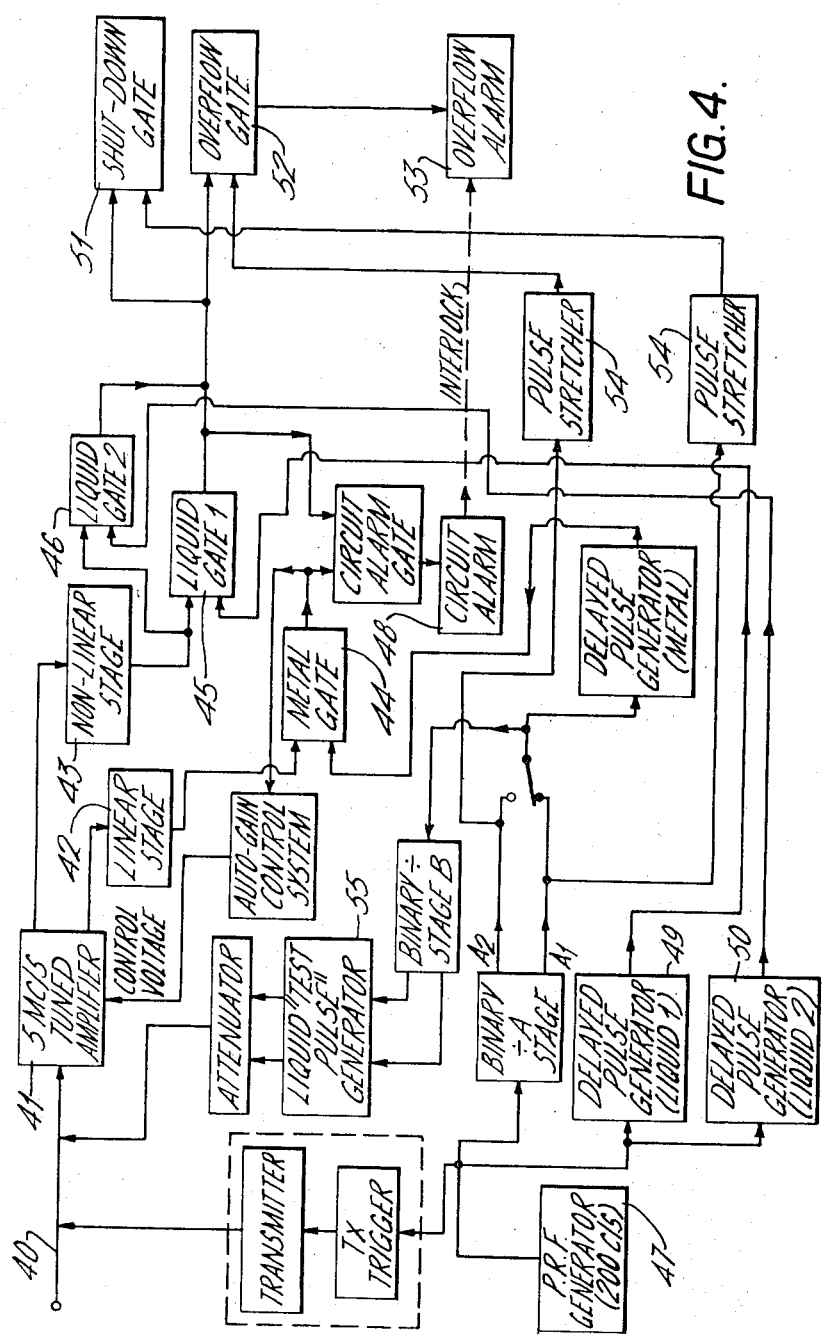

United States Patent Office 3,357,246
Patented Dec. 12, 1967

3,357,246
MULTI-STAGE ULTRASONIC PROBE
Richard John Stearn, Bletchley, and Anthony Charles Richardson, Richmond, England, assignors to The British Petroleum Company Limited, London, and Atkins Laboratories Limited, Surrey, England, both corporations of England
Filed Aug. 2, 1965, Ser. No. 476,493
Claims priority, application Great Britain, July 31, 1964, 30,280/64
10 Claims. (Cl. 73—290)

This invention relates to a multi-stage ultrasonic probe which is particularly adapted for use as a liquid presence detector. It is more especially concerned with a two-stage ultrasonic probe arranged for use in a liquid level detecting system of the type disclosed in co-pending U.S. application Ser. No. 423,546, filed Jan. 5, 1965, by Richard John Stearn for liquid presence detector.

It is an object of the present invention to provide a multi-stage ultrasonic probe which is particularly suitable for use in a liquid flow control system by providing two-stage control for initiating or terminating the flow of the liquid.

In accordance with the present invention, a multi-stage ultrasonic probe for detecting predetermined liquid levels comprises a head including means for transmitting and receiving ultrasonic waves, first and second stage portions capable of conveying ultrasonic waves, and first and second reflector plates spaced beyond the first and second stage portions respectively and remote from said head, the ratio of the distance between the base extremity of the first stage portion and the first reflector plate to the distance between the base extremity of the first stage portion and the base extremity of the second stage portion being less than the ratio of the velocity of sound in the liquid the level of which is to be determined to the velocity of sound in the material of the second stage portion.

According to one embodiment of the invention, the first and second stage portions are each frusto-conical in shape and are disposed concentrically one below the other with the first reflector plate located around and encircling the second lower stage portion.

According to a second embodiment of the invention, the two stage portions are formed from a single frusto-conical member which is provided with semi-circular cut-outs diametrically opposed to each other at first and second distances from the head so that the lower surface of each cut-out acts as a reflection surface for ultrasonic waves when the liquid fills the respective cut-outs.

In order that the invention may be more readily understood, two embodiments thereof will now be described by way of example and with reference to the accompanying drawings, in which:

FIG. 1 is a schematic view, partly in section, of a first embodiment of two-stage ultrasonic probe in accordance with the invention;

FIG. 2 is a schematic view of a second embodiment of two-stage ultrasonic probe in accordance with the invention;

FIGS. 3(a), 3(b) and 3(c) are pulse diagrams illustrating the signals received by the transducer in the head of the probe of FIG. 1; and, FIG. 4 is a block schematic diagram of electrical circuitry suitable for use with the probes of FIGS. 1 and 2.

Referring first to FIG. 1, the probe illustrated therein is formed from aluminum, Duralumin, or other similar material and comprises a relatively thin cylindrical disc 1, a first essentially frusto-conical stage 2, and a second essentially frusto-conical stage 3, the three parts being formed integrally with one another. A cylindrical head 4 into which is inserted a disc 5 of piezo-electric material, such as lead zirconate, quartz, barium titanate, Rochelle salt, or ammonium dihydrogen phosphate, is secured to the plane upper surface of the disc 1 to serve as an ultrasonic transducer.

The first stage 2 has a plane lower face 6 of annular shape and located beneath this face 6 is provided an annular aluminum or steel reflector plate 7 having a plane upper surface 8 lying parallel to the surface 6. This reflector plate 7 is mounted by means of spacers 9 so as to encircle the second stage 3, and the aperture of the annulus is made sufficiently large to enable the reflector plate to be passed over the base of the second stage.

A second, circular reflector plate 10 is positioned below the lower face 11 of the second stage 3, this plate having a plane upper surface 12 parallel with the surface 11 and being held in place by the spacers 9.

The location of the reflector plates 7 and 10 and the dimensions of the frusto-conical stages are of great importance for the satisfactory operation of the probe. As indicated in FIG. 1, the distance between face 6 and the surface 8 of reflector plate 7 is denoted by $d_1$, the distance between face 11 and the surface 12 of the reflector plate 10 by $d_2$, and the distance between faces 6 and 11, i.e. the depth of the second stage, by $d_3$. For satisfactory operation, the ratio of the distance $d_1$ to the distance $d_3$ must be less than the ratio of the velocity of sound in the liquid whose level is being detected to the velocity of sound in the material of the probe. In a preferred arrangement the radio $d_1/d_3$ is made equal to 0.134. This probe is adapted for use with liquid hydrocarbon fuels, and it will be seen that this value is less than the ratio of the velocity of sound in liquid hydrocarbon to the velocity of sound in aluminum which is greater than 0.157. If this relationship is not satisfied, signals from the reflector plates become confused with other signals.

The sides of the two stages 2 and 3 are preferably inclined at an angle of about 3° to the vertical. This conical form reduces the occurrence of trailing pulses due to partial conversion of ultrasonic energy to transverse waves. The two cones are of cylindrical form at their lower ends for ease in machining. In order that the ultrasonic energy from the piezo-electric material 5 is apportioned substantially equally between the two stages 2 and 3 the ratio of the area of the annular face 6 of the first stage 2 to the area of the circle formed by the head of the second stage 3 is arranged to be of the order of 3:1.

Referring now to FIG. 2 of the drawings, the probe shown therein comprises a cylindrical upper portion 20 formed integrally with a frusto-conical portion 21 which increases in cross-section with increasing distance from the upper portion 20. A cylindrical head 22 into which is inserted a disc 23 of piezo-electric material is secured to the plane top surface of the upper probe portion 20 to serve as an ultrasonic transducer.

The frusto-conical portion 21 is provided with three semi-circular cut-outs or recesses. Two of these cut-outs 24 and 25 are formed part way along the length of the cone and directly above one another leaving a semi-circular plate 26 of thickness $t$ therebetween. The plate 26 forms a reflecting body for the ultrasonic waves when the cut-out 24 is filled with liquid. The third cut-out 28 is situated adjacent to the bottom of the cone 21 and diametrically opposite the other two cut-outs 24 and 25. The portion 33 below the bottom surface 29 of the cut-out 28 also acts as a reflecting body for the ultrasonic waves when the cut-out is filled with the liquid and is likewise of thickness $t$.

As with the first embodiment the dimensions and spacings of the cutouts are of great importance for satisfactory operation of the probe. The thickness of cut-out 24, denoted by $d_1$, corresponds to the distance between the faces 6 and 8 in FIG. 1. Similarly, the thickness of cut-out 28, denoted by $d_2$, and the distance between the upper surface 30 of cut-out 24 and the upper surface 31 of cut-out 28, denoted by $d_3$, corresponds to the similarly denoted spacings in FIG. 1. Consequently, the same relationship must exist, i.e. the ratio of $d_1/d_3$ must be less than the ratio of the velocity of sound in the liquid to the velocity of sound in the material of the probe. The thickness $t$ of the plates is also critical for satisfactory operation, since they must act as efficient reflecting bodies for the waves when cut-outs 24 and 28 are filled with the liquid. The thickness $t$ should therefore be made equal to $(2n-1)\lambda/4$ where $n$ is any integer and $\lambda$ is the wavelength of the ultrasonic waves, so that there is complete mismatching at the surfaces 27 and 29 resulting in a high degree of reflection. The thickness of cut-out 25 is immaterial and, if desired, substantially all the half of the cone below the plate 26 may be cut away. Moreover, in order to avoid interference between the various reflected waves received back at the transducer head 22, the distances between the piezo-electric material 23 and reflection surfaces 30 and 31, denoted by $nl$ and $ml$ respectively, should each be an integral number multiple of the length 1 of the upper portion 20.

The upper portion 20 is also provided with two circumferential grooves 32 which are arranged to receive clamping means (not shown) for supporting the probe above and then in the liquid. The main advantage of this second embodiment is that it is easier to machine and produce and does not require the assembly of the plates and spacers used in the first embodiment.

Both embodiments are similar in operation. The probe is inserted into a compartment which is being filled with liquid, for example petrol. A pulse repetition frequency (PRF) generator operating at a pulse repetition frequency of 200 cycles per second actuates a transmitter which excites the piezo-electric material causing it to emit periodic ultrasonic signals. When the liquid level is below the bottom of the probe these signals will be reflected back to the piezo-electric material from the bottom surfaces 6 and 11 (FIG. 1) or 30 and 31 (FIG. 2) of the two stages of the probe.

The operation of the probe illustrated in FIG. 1 will now be described with reference to FIGS. 3(a)–3(c). In the pulse diagrams the figures above the signal peaks refer to the surfaces from which the waves have been reflected. FIG. 3(a) shows the pulse pattern received when the liquid level is below the probe. Neither of the spaces $d_1$ or $d_2$ is therefore filled and the waves cannot reach the reflector plates 7 and 10. As the liquid level rises the space $d_2$ is filled first and the pulse pattern as shown in FIG. 3(b) is received. Finally, when the liquid fills the space $d_2$ the pattern of FIG. 3(c) is received.

The probe is therefore particularly suitable for use in liquid flow control systems in which there is provided liquid flow control means actuated on receipt of signals from the two refletcor plates. The signal from the lower plate 10 may be employed to shut-off a coarse control valve and the signal from the upper plate 7 may be employed to shut-off a fine control valve. Alternatively, the signals from the two plates may be used to partially close and completely close respectively a control valve. In either case, a speedy and accurate shut-off is achieved without liquid surging.

Referring back to FIG. 3(a), an ultrasonic signal is emitted from the piezo-electric material 5 at time zero. 60 microseconds later the reflection from surface 6 is detected by the material. Next, a reflected signal from the base 11 of the second stage 3 is received followed by attentuated signals from the two surfaces 11 and 6.

As shown in FIG. 3(b), the signals from the bases 11 and 6 of the two stages are received first, followed after a further few microseconds, depending on the nature and temperature of the liquid, by a reflected signal from the surface 12 of reflector plate 10. The attenuated signals from the three surfaces are then received subsequently.

FIG. 3(c) shows the signals produced by the initial and attentuated reflections from the surface 8 of reflector plate 7 when the space $d_1$ is also filled with the liquid.

It should be appreciated that these diagrams show only the first attenuated signal from each reflection surface, subsequent attentuated signals being assumed to be negligible. Moreover, the relative positions of the pulses with respect to time are not represented accurately since these will vary in dependence on the construction of the probe and on the operating conditions.

In the case of the probe illustrated in FIG. 2 the pulse diagrams will also include reflected signals from the lower surface of the upper cylindrical portion 20 but otherwise the received pulses will correspond to those shown in FIGS. 3(a)–3(c).

The probe also has associated electrical circuitry similar to that described and illustrated in the above-mentioned co-pending application concerned with a single stage probe. The circuitry used with the single-stage probe is shown in FIG. 4 together with added components necessary for the two-stage probe of the present invention. Only a brief description of the circuitry will therefore be given, with emphasis on the additional components. Signals from the piezo-electric material obtained on line 40 are amplified in an amplifier 41 and the pulses are then passed to a linear circuit 42 and to a non-linear circuit 43. From the linear circuit 42 pulses are fed to a gating circuit 44, hereinafter referred to as a metal gate, and from the non-linear circuit 43 pulses are fed to two parallel-connected gating circuits 45 and 46, hereinafter referred to as liquid gates. Each liquid gate 45, 46 is associated with signals reflected across one of the liquid filled spaces of widths $d_1$ and $d_2$.

In order to ensure reliability the instrument continuously and automatically checks its own operation. Signals initiated by the generator 47 are continuously monitored by the circuitry before being passed to an alarm circuit. If any signal is not detected or is wrongly detected for example because of its non-occurrence or occurrence at the wrong time, then the circuit alarm 48 is tripped and a warning is given.

Due to having two liquid gates 45, 46 two delayed liquid pulse generators 49 and 50 are required. Signals from the generator 47 initiate from the two delayed liquid pulse generators 49, 50 gating pulses covering the period of time during which signals from the respective reflection surfaces or reflector plates may arrive due to different liquids and variations of temperature. The outputs from the respective generators are supplied to one input of the liquid gates 45, 46, the other gate inputs being obtained from the non-linear circuit 43.

From the liquid gates signals are passed to the circuit alarm 48 and to two further gating circuits, a shut-down gate 51 and an overflow or shut-off gate 52. The shut-down and shut-off gates are each adapted to energise liquid flow controlling mechanisms and the shut-off gate is also connected to an overflow alarm 53. These gates can also be adapted to renew the flow of liquid if desired. Each of these two gates has one input connected to the PRF generator 47 by way of a binary stage A and a pulse stretcher 54 which in fact comprises a gate delay network and a gate generator network.

The circuit arrangement is such that each gating circuit will only pass expected signals at the expected time. Any deviation from this pattern, whether caused by malfunctioning of the instrument or by additional signals from the reflector plates or surfaces is instantly detected. Once a deviation is detected in any part of the circuitry it is rapidly transmitted to the circuit alarm 48 or the overflow alarm 53, whichever is relevant, and the appropriate action is taken.

The arrangement is particularly adaptable for use with a series of probes, for example four, each concerned with a different liquid flow. In such a case relay units are used to provide the necessary switching action between the probes, and the liquid test pulse generator 55 is provided with four test delay circuits connected between its input and the outputs of two binary stages $B_1$ and $B_2$. These four delay circuits are timed to define the leading edge and the trailing edge of the shut-down and overflow gate periods.

We claim:

1. A multi-stage ultrasonic probe for detecting predetermined liquid levels which comprises a head including means for transmitting and receiving ultrasonic waves, first and second stage portions capable of conveying ultrasonic waves, and first and second reflector plates spaced beyond the first and second stage portions respectively and remote said head, the ratio of the distance between the base extremity of the first stage portion and the first reflector plate to the distance between the base extremity of the first stage portion and the base extremity of the second stage portion being less than the ratio of the velocity of sound in the liquid the level of which is to be determined to the velocity of sound in the material of the second stage portion.

2. A probe according to claim 1, in which the first and second stage portions are each substantially frusto-conical in shape.

3. A probe according to claim 2, in which the first and second stage portions are disposed concentrically one below the other with the apex portion of the second stage in contact with the base of said first stage.

4. A probe according to claim 3, in which the first reflector plate is located around and encircling the second stage portion.

5. A probe according to claim 4, in which the first reflector plate is an annular disc capable of being passed over the base of said second stage portion.

6. A probe according to claim 1, in which the first and second stage portions are formed from the two longitudinally extending halves of a single frusto-conical member.

7. A probe according to claim 6, in which said frusto-conical member is provided with first and second semi-circular cut-outs diametrically opposed to each other at first and second distances from the head so that the lower surface of each cut-out acts as a reflection surface for the ultrasonic waves when the liquid fills the respective cut-outs.

8. A probe according to claim 7, in which a third semi-circular cut-out is provided below the cut-out nearest to said head to define the first reflector plate between the cut-outs, the thickness of this reflector plate being such that there is complete mis-matching of the waves at the first liquid/solid interface.

9. A probe according to claim 1, in which the head includes a piezo-electric transducer.

10. A probe according to claim 1, in which the first and second stage portions are made of aluminum.

References Cited

UNITED STATES PATENTS 3,010,318  11/1961  Mongan _____ 73—290

LOUIS R. PRINCE, *Primary Examiner.*

D. WOODIEL, *Assistant Examiner.*

UNITED STATES PATENT OFFICE

CERTIFICATE OF CORRECTION

Patent No. 3,357,246                        December 12, 1967

Richard John Stearn et al.

It is hereby certified that error appears in the above numbered patent requiring correction and that the said Letters Patent should read as corrected below.

Column 2, line 70, for "cutouts" read -- cut-outs --; column 3, line 40, for "wlil" read -- will --; line 57, for "refletcor" read -- reflector --; column 5, line 17, for "remote said" read -- remote from said --.

Signed and sealed this 18th day of February 1969.

(SEAL)
Attest:

Edward M. Fletcher, Jr.
Attesting Officer

EDWARD J. BRENNER
Commissioner of Patents